US011093226B2

(12) United States Patent
Maor

(10) Patent No.: US 11,093,226 B2
(45) Date of Patent: Aug. 17, 2021

(54) METHODS, SYSTEMS, AND APPARATUS FOR A GENERIC FIRMWARE-BASED KERNEL LIBRARY MECHANISM

(71) Applicant: Intel Corporation, Santa Clara, CA (US)

(72) Inventor: Moshe Maor, Kiryat Mozking (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/541,131

(22) Filed: Aug. 14, 2019

(65) Prior Publication Data
US 2019/0369975 A1    Dec. 5, 2019

(51) Int. Cl.
*G06F 8/54*    (2018.01)
*G06F 11/36*   (2006.01)
*G06F 9/445*   (2018.01)

(52) U.S. Cl.
CPC .............. *G06F 8/54* (2013.01); *G06F 9/445* (2013.01); *G06F 11/3624* (2013.01)

(58) Field of Classification Search
CPC ......... G06F 8/54; G06F 11/3624; G06F 9/445
See application file for complete search history.

(56) References Cited

U.S. PATENT DOCUMENTS

| 2013/0042225 | A1* | 2/2013  | Wu ..................... G06F 9/44536 717/165 |
| 2016/0335120 | A1  | 11/2016 | Gupta et al. |
| 2017/0286066 | A1* | 10/2017 | Gathala ............... G06F 11/3624 |
| 2018/0260437 | A1* | 9/2018  | Paroski ................ G06F 16/242 |

OTHER PUBLICATIONS

Ramy Gad et al., Compiler Driven Automatic Kernel Context Migration for Heterogeneous Computing, IEEE, 2014, retrieved online on Nov. 13, 2020, pp. 389-398. Retrieved from the internet: <URL: https://ieeexplore.IEEE.org/stamp/stamp.jsp?tp=&arnumber=6888915>. (Year: 2014).*

(Continued)

*Primary Examiner* — Hanh Thi-Minh Bui
(74) *Attorney, Agent, or Firm* — Hanley, Flight & Zimmerman, LLC

(57) ABSTRACT

Apparatus, systems, and methods for a generic firmware-based kernel library mechanism are disclosed. An example apparatus includes a compiler to compile kernels into an executable and linkable format, an image generator to generate library images from executable and linkable format locations, a reducer to retrieve a library image, the library image retrieved starting from a first section of an existing library, the retrieved library image to be used as a platform for developing a new kernel library, a selector to select kernels to include in the new kernel library, one or more libraries organized into a defined number of kernel banks, the kernels combined based on intended application development, and a linker to link a library start function pointer to the library start function, the library start function positioned within the library image, the pointer incorporated in a first section of the library image.

15 Claims, 8 Drawing Sheets

(56) References Cited

OTHER PUBLICATIONS

Pirmin Vogel et al., Lightweight Virtual Memory Support for Zero-Copy Sharing of Pointer-Rich Data Structures in heterogeneous Embedded SoCs, IEEE, 2017, retrieved online on Apr. 24, 2021, pp. 1947-1959. Retrieved from the Internet: <URL: https://ieeexplore.IEEE.org/stamp/stamp.jsp?tp=&arnumber=7797491>. (Year: 2017).*
European Patent Office, "Extended European Search Report," issued in connection with European Patent Application No. 20179965.7, dated Dec. 2, 2020, 12 pages.
Moore et al., "VForce: An Environment for Portable Applications on High Performance Systems with Accelerators," 2012, Journal of Parallel and Distributed Computing (JPDC), vol. 72, 13 pages.
Rodriguez-Gutiez et al., "Toward a BLAS Library Truly Portable Across Different Accelerator Types," 2019, The Journal of Supercomputing, 24 pages.

* cited by examiner

METHODS, SYSTEMS, AND APPARATUS FOR A GENERIC FIRMWARE-BASED KERNEL LIBRARY MECHANISM

FIELD OF THE DISCLOSURE

This disclosure relates generally to computer system development, and, more particularly, to methods, systems, and apparatus for a generic firmware-based kernel library mechanism.

BACKGROUND

Computer hardware manufacturers develop processing elements, known as accelerators, to accelerate the processing of a workload. For example, an accelerator can be a CPU, a graphics processing units (GPUs), a vision processing units (VPUs), and/or a field programmable gate arrays (FPGAs). Workloads related to artificial intelligence (AI) processing can include deep learning topology and/or computer vision, with AI developers aiming to optimize the performance of deep neural networks on various hardware platforms.

BRIEF DESCRIPTION OF THE DRAWINGS

The figures are not to scale. In general, the same reference numbers will be used throughout the drawing(s) and accompanying written description to refer to the same or like parts.

Figure 1:
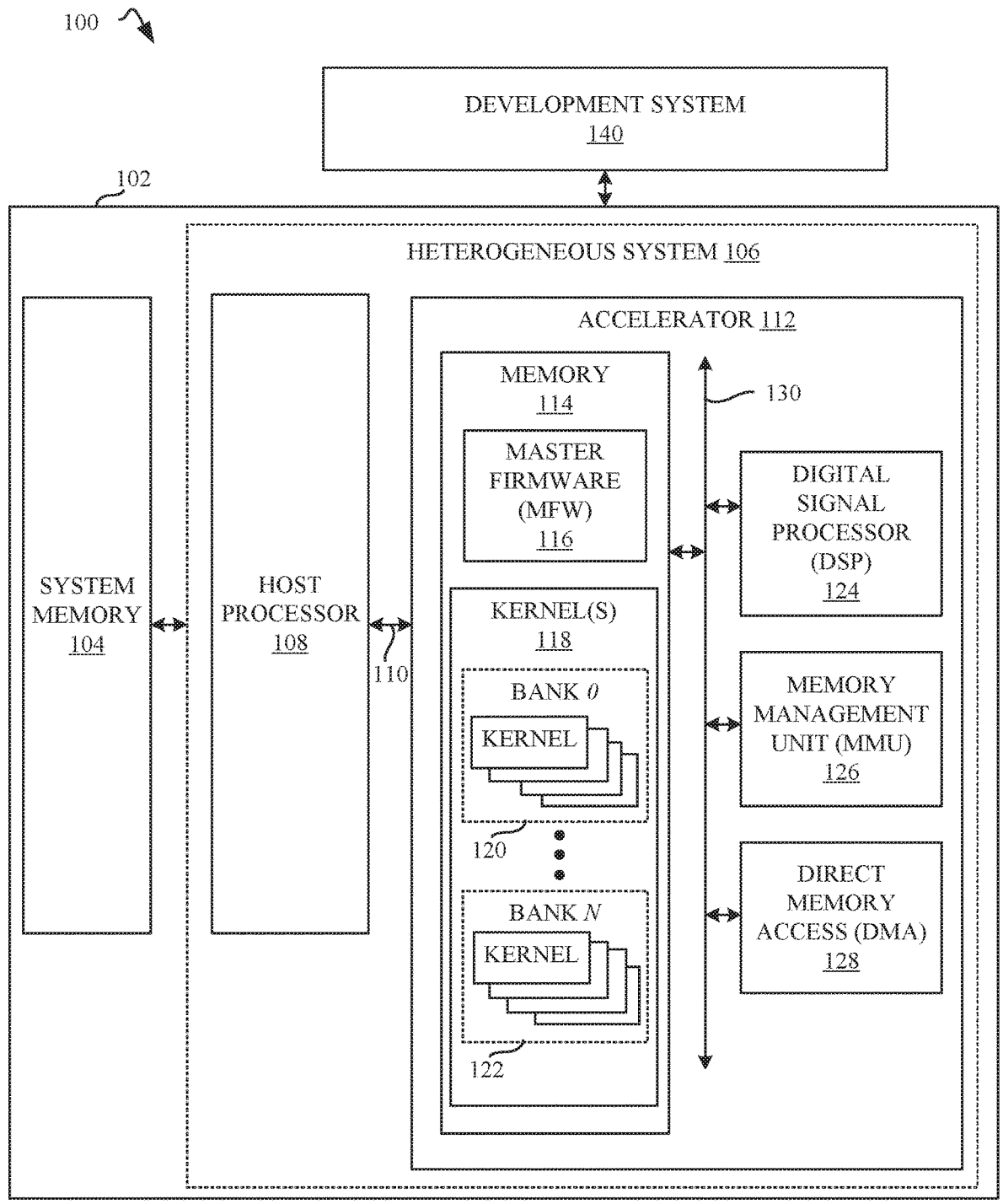
FIG. 1 is a block diagram illustrating an example environment in which a system for kernel library development is implemented.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

DETAILED DESCRIPTION

Processing elements, such as accelerators, are developed to accelerate the processing of a workload. For example, an accelerator can be a central processing unit (CPU), a graphics processing unit (GPU), a vision processing unit (VPU), and/or a field programmable gate array (FPGA). Heterogeneous computing systems can incorporate a number of such specialized processors into a single system or a single chip (e.g., System on Chip (SoC)). Accelerators can also be designed to improve the processing of artificial intelligence (AI) applications. While a VPU is a specific type of AI accelerator, many different AI accelerators can be utilized. For example, AI accelerators can be implemented by application-specific integrated circuits (ASICs) designed to improve the processing of tasks related to a particular type of AI, such as machine learning (ML), deep learning (DL), and/or other artificial machine-driven logic. As such, workloads related to AI processing can include deep learning topology and/or computer vision, with AI developers aiming to optimize the performance of deep neural networks on various hardware platforms.

A developer can run a function, algorithm, program, application, and/or other code on a heterogeneous system, generating a schedule (e.g., a graph) for the function, algorithm, program, application, and/or other code at compile time. Once a schedule is generated, the schedule is combined with the function, algorithm, program, application, and/or other code specification to generate an executable file. Such a schedule can be represented as a graph, including nodes, such that the graph represents a workload and each node (e.g., a workload node) represents a particular task of that workload. Connections between the different nodes in the graph represent data inputs and/or outputs needed in order for a particular workload node to be executed. A workload node can then be assigned and/or sent to a digital signal processor (DSP) and/or a kernel located in the DSP. The kernels serve as a collection of loadable functions which are implementations of algorithms, such that every kernel is an implementation of a single algorithm/single node. For example, kernels can represent applications that an operating system (e.g., master firmware) calls to execute the algorithms. In some examples, kernels can be implementations of specific algorithms from a list of deep-learning processing operations derived from deep learning frameworks (e.g., Caffe2, ONNX, etc.). For example, nodes can be constructed based on catalogues provided by such deep learning frameworks. In order to execute such nodes, different sets of kernels can be loaded (e.g., deployment of a kernel library) in order for the DSP to call the kernels. For an operating system (e.g., firmware) to perform scheduling and executing, the kernel libraries must be executable by the system. However, kernels loaded into an accelerator post-production require reconfiguration of the DSP. For example, workload nodes may not be properly sent to new kernels that have been produced and/or otherwise loaded into an accelerator.

Methods, apparatus, and systems for a generic firmware-based kernel library mechanism disclosed herein allow for improved efficiency of kernel library development through the decoupling of the kernel library development process from the firmware. Examples disclosed herein permit the development and wrapping of kernels in libraries which are dynamically loadable during execution by generic firmware (e.g., master firmware (MFW) product, home-brewed operating system, etc.) without the need for a compile time link to the MFW. Examples disclosed herein further allow the flexibility of introducing newer versions of the MFW while the libraries do not have to be rebuilt, which is especially important if they are customer-developed libraries. Examples disclosed herein permit the linking of kernels against the MFW, with the new kernels and kernel libraries created after the main MFW has been frozen and released in a product, such that the main MFW sources are not needed during the development process. Furthermore, examples disclosed herein also allow for source level debugging of kernels during development along with the main application.

FIG. 1 is a block diagram illustrating an example environment in which a system for kernel library development is implemented. In the example of FIG. 1, the deployment system 100 includes an example computing system 102, an example system memory 104, an example heterogeneous system 106, an example host processor 108, an example first communication bus 110, an example accelerator 112, and an example development system 140.

In the example of FIG. 1, the system memory 104 may be implemented by any device for storing data such as, for example, flash memory, magnetic media, optical media, etc. Furthermore, the data stored in the example system memory 104 may be in any data format such as, for example, binary data, comma delimited data, tab delimited data, structured query language (SQL) structures, etc. The example system memory 104 is coupled to the example heterogeneous system 106. In FIG. 1, the example system memory 104 is a shared storage between at least one of the example host processor 108 and the example accelerator 112. In the example of FIG. 1, the system memory 104 is a physical storage local to the computing system 102. In other examples, the system memory 104 may be external to and/or otherwise be remote with respect to the computing system 102. In further examples, the system memory 104 may be a virtual storage. In the example of FIG. 1, the system memory 104 is a non-volatile memory (e.g., read only memory (ROM), programmable ROM (PROM), erasable PROM (EPROM), electrically erasable PROM (EEPROM), etc.). In other examples, the system memory 104 may be a non-volatile basic input/output system (BIOS) or a flash storage. In further examples, the system memory 104 may be a volatile memory.

In FIG. 1, the heterogeneous system 106 is coupled to the system memory 104. In the example of FIG. 1, the heterogeneous system 106 processes a workload by executing the workload on the host processor 108 and/or one or more of the example accelerator(s) 112. In FIG. 1, the heterogeneous system 106 is a system on a chip (SoC). Alternatively, the heterogeneous system 106 may be any other type of computing or hardware system. In the example of FIG. 1, the host processor 108 is a processing element configured to execute instructions (e.g., machine-readable instructions) to perform and/or otherwise facilitate the completion of operations associated with a computer and/or or computing device (e.g., the computing system 102). In the example of FIG. 1, the host processor 108 is a primary processing element for the heterogeneous system 106 and includes at least one core. Alternatively, the host processor 108 may be a co-primary processing element (e.g., in an example where more than one CPU is utilized) while, in other examples, the host processor 108 may be a secondary processing element. In the illustrated example of FIG. 1, one or more of the accelerator(s) 112 are processing elements that may be utilized by a program executing on the heterogeneous system 106 for computing tasks, such as hardware acceleration. For example, the example accelerator 112 is a processing element that includes processing resources that are designed and/or otherwise configured or structured to improve the processing speed.

In examples disclosed herein, each of the host processor 108 and the accelerator(s) 112 is in communication with the other elements of the computing system 100 and/or the system memory 104. For example, the host processor 108, the accelerator(s) 112, and/or the system memory 104 are in communication via the first communication bus 110. In some examples disclosed herein, the host processor 108, the accelerator (s) 112, and/or the system memory 102 may be in communication via any suitable wired and/or wireless communication method. Additionally, in some examples disclosed herein, each of the host processor 108, the accelerator (s) 112, and/or the system memory 104 may be in communication with any component exterior to the computing system 100 via any suitable wired and/or wireless communication method.

In the example of FIG. 1, example accelerator(s) 112 includes an example memory 114, an example digital signal processor (DSP) 124, an example memory management unit (MMU) 126, an example direct memory access (DMA) 128, and an example communication bus 130. The example memory 114 includes an example generic firmware (MFW) 116, an example kernel(s) 118, the example kernel(s) 118 including an example set of banks (e.g., example bank 120, example bank 122) containing loaded kernel library images. In the example of FIG. 1, the memory 114 may be implemented by any device for storing data such as, for example, flash memory, magnetic media, optical media, etc. Furthermore, the data stored in the example memory 114 may be in any data format such as, for example, binary data, comma delimited data, tab delimited data, structured query language (SQL) structures, etc. The memory 114 is a shared storage between at least one of the MMU 126 and the DSP 124, including direct memory access (DMA) 128 functionality. Moreover, the memory 114 allows at least one of the MMU 126, the MFW 116, and the DSP 124 to access the system memory 104 independent of the host processor 108. In the example of FIG. 1, the memory 114 is a physical storage local to the example accelerator 112. In some examples, the memory 114 may be external to and/or otherwise be remote with respect to the accelerator 112. In further examples, the memory 114 may be a virtual storage. In the example of FIG. 1, the memory 114 is a non-volatile storage (e.g., read only memory (ROM), programmable ROM (PROM), erasable PROM (EPROM), electrically erasable PROM (EEPROM), etc.). In other examples, the memory 114 may be a non-volatile basic input/output system (BIOS) or a flash storage. In further examples, the memory 114 may be a volatile memory.

In the illustrated example of FIG. 1, the example MMU 126 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The MMU 126 is a device that includes references to all the addresses of the memory 114 and/or the system memory 104. The MMU 126 additionally translates virtual memory addresses utilized by one or more of the DSP 124 to physical addresses in the memory 114 and/or the system memory 104. In the example of FIG. 1, the DSP 124 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The DSP 124 is a device that improves the processing of digital signals. For example, the DSP 124 facilitates the processing to measure, filter, and/or compress continuous real-world signals such as data from cameras, and/or other sensors related to computer vision.

In the example of FIG. 1, each of the kernel library images within bank 120 and bank 122 is a data structure that includes one or more kernels. The kernels of the library are, for example, routines compiled for high throughput on the DSP 124. The kernels correspond to, for example, executable sub-sections of an executable to be run on the computing system 100. In examples disclosed herein, each of the memory 114, the MMU 126, the DSP 124, and any other hardware logic element is in communication with the other elements of the accelerator 112. For example, the memory 114, the MMU 126, and the DSP 124 are in communication via an example second communication bus 130. In some examples, the second communication bus 130 may be implemented by a computing fabric. In some examples disclosed herein, the memory 114, the MMU 126, and the DSP 124 may be in communication via any suitable wired and/or wireless communication method. Additionally, in some examples disclosed herein, each of the MMU 126 and the DSP 124 may be in communication with any component exterior to the accelerator 112 via any suitable wired and/or wireless communication method. While the heterogeneous system 106 of FIG. 1 includes the host processor 108 and the accelerator(s) 112, in some examples, the heterogeneous system 106 may include any number of processing elements (e.g., host processors and/or accelerators) including application-specific instruction set processors (ASIPs), physic processing units (PPUs), designated DSPs, image processors, coprocessors, floating-point units, network processors, multi-core processors, and front-end processors.

In the example of FIG. 1, the development system 140 is used to develop and debug a new kernel library or libraries. Once developed, the new kernel library or libraries (e.g., kernel libraries in bank 120 and/or bank 122) are deployed onto the example computing system 100 by loading the libraries. For example, the host processor 108 can include a software stack that places an image of the developed kernel library in the memory (e.g., memory 104 and/or 114). The software stack calls firmware (e.g., example MFW 116) running on the example DSP 124, issuing a command to the firmware to bind to the library. The issued command can include the specific address (e.g., memory address) into which the library image was placed by the example host processor 108. In the examples disclosed herein, the example MFW 116 binds to the loaded library by locating and executing a library start function (e.g., libstart( )) within the library image.

Figure 2:
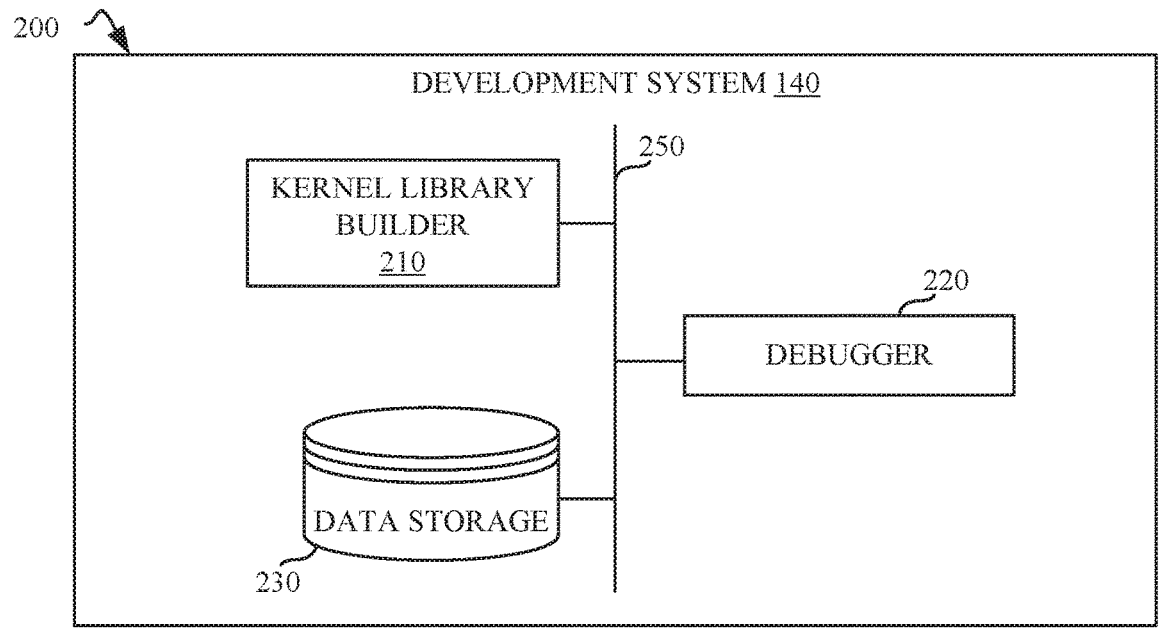
FIG. 2 is a block diagram of an example kernel library development system, constructed in accordance with teachings of this disclosure for purposes of generic firmware-based kernel library development.

FIG. 2 is a block diagram 200 of an example kernel library development system 140, constructed in accordance with teachings of this disclosure for purposes of generic firmware-based kernel library development. In the example of FIG. 2, the development system 140 includes an example kernel library builder 210, an example debugger 220, and an example data storage 230. The example kernel library builder 210 is used for purposes of developing new kernels and kernel libraries for loading into the example memory 114 of the example accelerator 112 of FIG. 1. The example kernel library builder 210 develops kernel libraries without the need for firmware-level sources. For example, kernel libraries developed by the example kernel library builder 210 can be loaded into accelerator memory 114 before or after the example firmware 116 of FIG. 1 has been loaded into the same example memory 114. The example debugger 220 of the example development system 140 permits source-level debugging of kernels during development along with the main application (e.g., the example MFW 116). The example data storage of FIG. 2 may be implemented by any device for storing data such as, for example, flash memory, magnetic media, optical media, etc. Furthermore, the data stored in the example data storage 230 may be in any data format such as, for example, binary data, comma delimited data, tab delimited data, structured query language (SQL) structures, etc. In FIG. 2, the data storage 230 is configured to store data associated with the kernel library building or debugging processes. The data storage 230 may be written to and/or read from by any of kernel library builder 210 and/or debugger 220. In operation, any of the example kernel library builder 210, the example debugger 220, and/or the example data storage 230 may communicate via an example communication bus 250. In FIG. 2, the communication bus 250 may be implemented using any suitable communication method and/or apparatus (e.g., Bluetooth® communication, LAN communication, WLAN communication, etc.).

Figure 3:
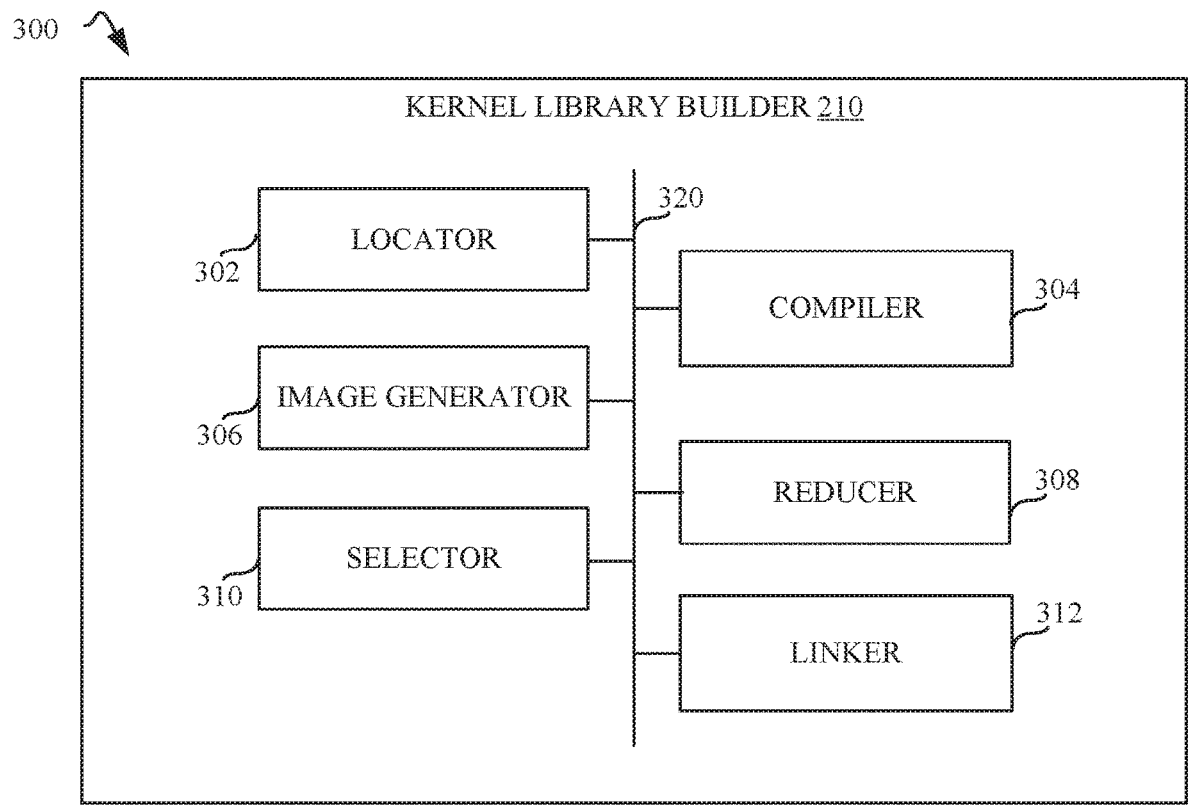
FIG. 3 is a block diagram of an example kernel library builder that may be implemented with the example kernel library development system of FIGS. 1-2.

FIG. 3 is a block diagram 300 of an example kernel library builder 210 that may be implemented with the example kernel library development system 140 of FIGS. 1-2. The example kernel library builder 210 includes an example locator 302, an example compiler 304, an example image generator 306, an example reducer 308, an example selector 310, and an example linker 312. In operation, any of the example locator 302, example compiler 304, example image generator 306, example reducer 308, example selector 310, and example linker 312 may communicate via an example communication bus 320. The example locator 302 locates data within existing kernel libraries based on a memory address. For example, the locator 302 can locate existing kernel library banks in the example memory 114 of FIG. 1 during the kernel library building process. In some examples, the compiler 304 compiles kernels into an executable and linkable format (ELF) file (e.g., a Unix format used by Linux, System V Unix, BSD Unix variants, and/or Sun Solaris, etc.). The example image generator 306 generates kernel library images. In some examples, the image generator 306 generates library images from ELF file locations. In some examples, the image generator 306 generates kernel library images that can be loaded during execution. The example reducer 308 reduces sections of the library image to extract information (e.g., kernel functions, kernels table, etc.) needed for the development of a new kernel library. The example selector 310 selects kernels to be included in a new library for organization into a system manager-defined number of banks depending on the intended usage of the developed kernel library. The example kernel library builder 210 then assigns user-defined kernel combinations into kernel libraries. For example, the kernel library builder 210 assigns the kernel libraries into a specific bank to be loaded into the example memory 114 of FIG. 1. For example, the image generator 306 generates a library image during the library build process such that the library image can be loaded into a particular bank n out of N possible banks. The example development system 140 can use the kernel library builder 210 to build the exact same library content several times (e.g., same kernels in the same order) for different banks. In some examples, the arrangement of kernels inside the library is such that kernels are ordered from 0 to n−1 for a total n kernels within the library. In the examples disclosed herein, the MFW 116 calls a particular kernel m (e.g., such that 0≤m<n) by accessing the mth entry in the kernel descriptor table (e.g., kerneltable) from which an address of a kernel m callback function can be obtained. Furthermore, in the examples disclosed herein, the MFW 116 accesses a relevant kernel descriptor of the library that was loaded into a bank based on the bank number and location (e.g., memory address) of the needed kernel within the bank (e.g., bank 0 120 thru bank N 122 of FIG. 1).

The example kernel library builder 210 can use a pointer to store the memory address of another value located in the computer memory. For example, the pointer can reference a location in the memory and obtain the value stored at that location. In some examples, the pointer can be used by the MFW to identify a library start function (e.g., libstart( )) in the kernel library image). The example linker 312 collects and combines pieces of code (e.g., written using programming languages such as C, C++, Java®, Pascal, etc.) and data into a single file that can be loaded into the example memory 114 and executed. For example, the linker 312 can link the pointer to the library start function in the library image. In some examples, the linker 312 can enable separate compilation, such that applications can be decomposed into smaller, more manageable modules that can be modified and compiled separately, such that any changes to one of the modules requires recompiling that module only, without having to recompile other associated files.

While an example manner of implementing the example development system 140 of FIG. 1 is illustrated in FIGS. 2-3, one or more of the elements, processes and/or devices illustrated in FIGS. 2-3 may be combined, divided, re-arranged, omitted, eliminated and/or implemented in any other way. Further, the example locator 302, the example compiler 304, the example image generator 306, the example reducer 308, the example selector 310, the example linker 312, the example debugger 220, the example data storage 230, and/or, more generally, the example development system 140 of FIGS. 2-3 may be implemented by hardware, software, firmware and/or any combination of hardware, software and/or firmware. Thus, for example, any of the example locator 302, the example compiler 304, the example image generator 306, the example reducer 308, the example selector 310, the example linker 312, the example debugger 220, the example data storage 230, and/or, more generally, the example development system 140 of FIGS. 2-3, and/or the example memory 114, the example MFW 116, the example kernel(s) 118, the example DSP 124, the example MMU 126, the example DMA 128 and/or, more generally, the example accelerator 112 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example locator 302, the example compiler 304, the example image generator 306, the example reducer 308, the example selector 310, the example linker 312, the example debugger 220, the example data storage 230, and/or, more generally, the example development system 140 of FIGS. 2-3, and/or the example memory 114, the example MFW 116, the example kernel(s) 118, the example DSP 124, the example MMU 126, the example DMA 128 and/or, more generally, the example accelerator 112 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the development system of FIGS. 2-3 and/or the example accelerator 112 of FIG. 1 may include one or more elements, processes and/or devices in addition to, or instead of, those illustrated in FIGS. 1, 2, and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
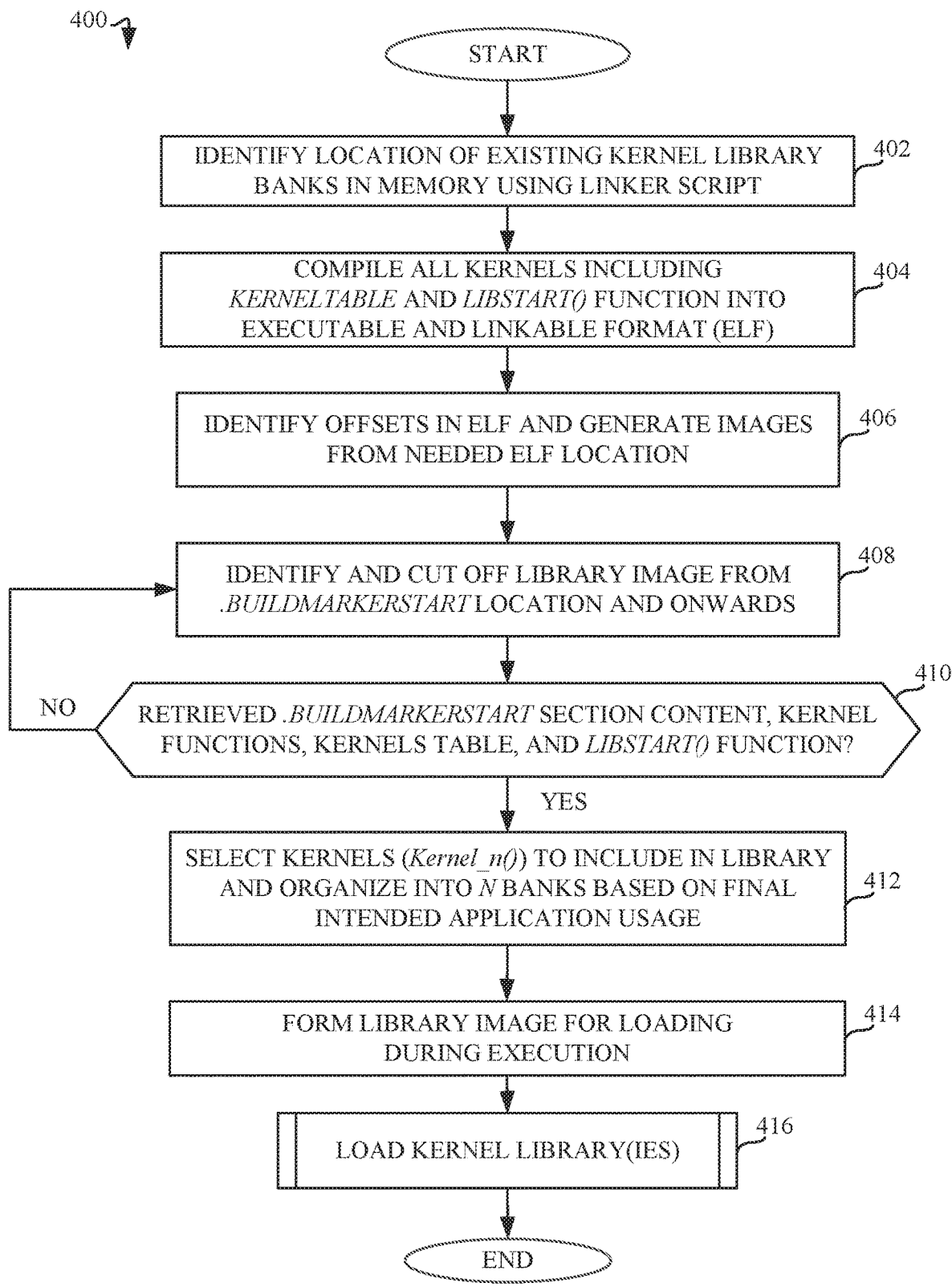
FIG. 4 is a flowchart representative of machine readable instructions which may be executed to implement elements of the example kernel library builder of FIG. 3, the flowchart representative of instructions implemented to build a kernel library.
Figure 5:
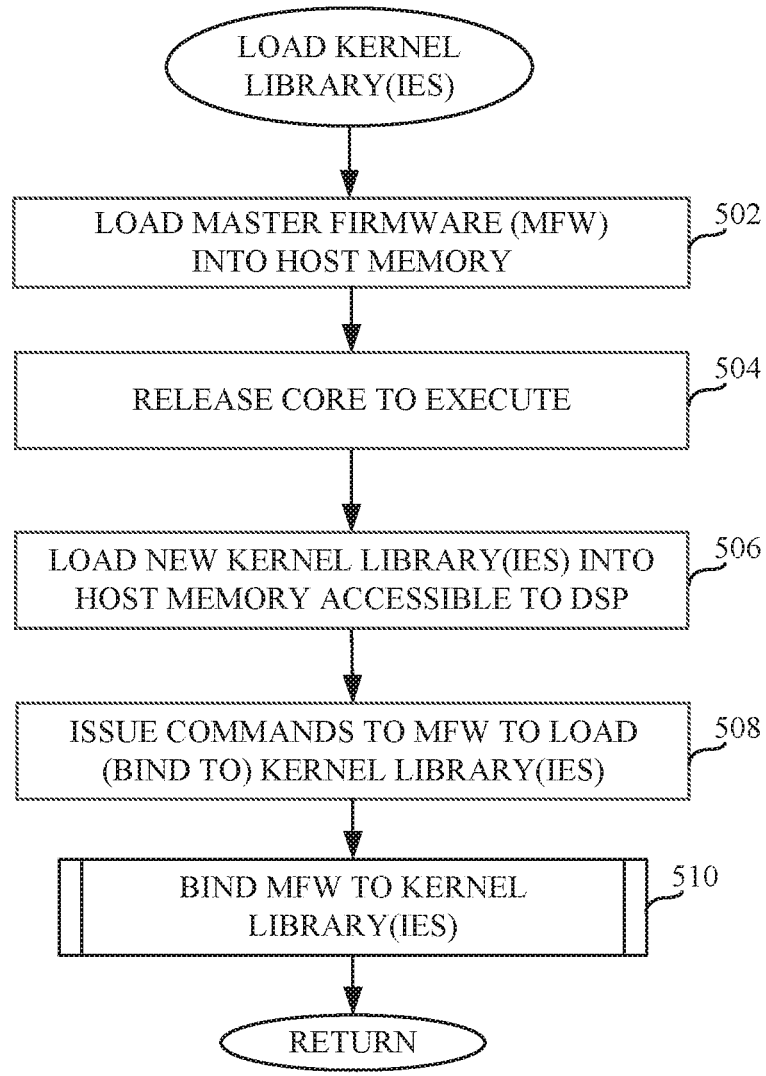
FIG. 5 is a flowchart representative of machine readable instructions which may be executed to implement the elements of the example computing system of FIG. 1, the flowchart representative of instructions implemented to load a kernel library developed using the example development system of FIG. 2.

Flowcharts representative of example hardware logic, machine readable instructions, hardware implemented state machines, and/or any combination thereof for implementing the example development system 140 and/or the example accelerator 112 is shown in FIGS. 4, 5 and/or 6. The machine readable instructions may be one or more executable programs or portion(s) of an executable program for execution by a computer processor such as the processor 906 and/or the accelerator 916 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 906 and/or the accelerator 916, but the entire program and/or parts thereof could alternatively be executed by a device other than the processor 906, accelerator 916, and/or embodied in firmware or dedicated hardware. Further, although the example program is described with reference to the flowcharts illustrated in FIGS. 4-6, many other methods of implementing the example development system 140 and/or the example accelerator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart 400 representative of machine readable instructions which may be executed to implement elements of the example kernel library builder 210 of FIG. 3, the flowchart representative of instructions implemented to build a kernel library. In the illustrated example of FIG. 4, the example locator 302 locates existing kernel library banks (e.g., example kernel(s) 118 of FIG. 1 with kernel banks 120 and 122) in the example memory 114 using a linker script (block 402). In some examples, the specialized linker script provides a memory map that matches the location of a kernel bank in the example memory 114. The example compiler 304 compiles the kernels located in the example kernel library banks 120 and 122 of FIG. 1 into, for example, a regular executable and linkable format (ELF) (block 404). The ELF file includes a header, sections and segments. While the header contains general information about an ELF binary, sections include information needed for linking a target object file to build a working executable, and segments break down the structure of an ELF to prepare the executable to be loaded into memory. The example compiler 304 includes sections of the kernel that correspond to identifiers of the kernel table (e.g., kerneltable) and library start function (e.g., libstart( )) in the generated ELF. The example kernel library builder 210 identifies offsets in the ELF and uses the example image generator 306 to generate a library image from the ELF location which includes the kerneltable, libstart( ), and kernel functions (e.g., kernel_1 ( ), kernel_n( )) (block 406). In some examples, GNU tools can be used to identify offsets in ELF (e.g., objdump, used to display information about one or more object files) and generate the library image from the needed location (e.g., dumpelf, used to convert internal ELF structures into equivalent C code structures). The example kernel library builder 210 identifies the starting point (e.g., buildmarkerstart) of the library image which includes the kerneltable and libstart( ) in order to generate, using the example image generator 306, a library image for use in developing a new kernel library. In order to minimize the generated library image to sections which include the kernel library functions, kernelstable, and the libstart( ) function, but exclude the operating system-specific sections of the ELF, the example kernel library builder 210 uses the example reducer 308 to cut off the library image from the buildmarkerstart location and onwards (block 408). In some examples, the regions of the ELF are cut as described above given that only a single main application can be loaded onto a DSP. As such, during the development of the kernel library, any base code (e.g., reset code, interrupt handlers, clib, CRT code, etc.) is not needed. For example, the reducer 308 removes the operating system base code from the ELF. If the example kernel library builder 210 retrieves the buildmarkerstart section content, kernel functions, the kernelstable, and the libstart( ) function (block 410), the example kernel library builder 210 proceeds to initiate the kernel library building process.

The example kernel library builder 210 initiates the example selector 310 to select kernel functions (e.g., kernel_n( )) to include in an example kernel library. Once the kernel functions to be included in the kernel library are selected, the example kernel library builder 210 assigns the compiled kernel functions into kernel libraries (block 412). In some examples, the kernel library builder 210 can generate any combination of kernels such that, once the library has been developed, the library image can be loaded into a specific bank n. The example kernel library builder 210 determines (e.g., based on input from a user or system manager) which library images to load into a given set of banks according to specific application needs and the intended functional purpose of the kernel library in development. In some examples, a single execution of the library building process generates one library image for one bank, with the process repeated to build a similar library (e.g., containing the same sets of kernels) for a different bank. In order to allow the example master firmware (MFW) 116 of FIG. 1 the ability to execute the developed kernel library or libraries once the library image or images have been mapped in the example memory 114, the example kernel library builder 210 incorporates, into the beginning of the library image (e.g., buildmarkerstart) a pointer to the library start function (e.g., libstart( )). In some examples, the pointer to libstart( ) is incorporated into the first 16 bytes within the library image to allow the example MFW 116 to call libstart ( ) by locating the pointer to the library start function (e.g., since the pointer stores the memory address of another value located in the computer memory, the pointer can be used, by the example MFW 116, to reference a location in the example memory 114 and obtain the value stored at that location corresponding to the location of libstart( )). In some examples, the linker 312 collects and combines pieces of code and data into a single file that can be loaded into memory and executed. For example, the linker 312 can link the pointer to the library start function in the library image. Once the example kernel library builder 210 builds the library using the steps described above, the example image generator 306 forms a library image for loading during execution (block 414). When the fully-developed kernel library is ready for MFW-based execution in the example computing system 102 of FIG. 1, the example development system 140 loads the kernel library or libraries to the example computing system 102 (block 416). In some examples during kernel library development, the example development system 140 can initiate an example debugger 220 to perform debugging functions to locate and remove any errors or abnormalities that can be introduced into the written code (e.g., written using programming languages such as C, C++, Java®, Pascal, etc.) during kernel library development. The example debugger 220 allows for the example kernel library builder 210 to access code sections that are in need of debugging, with the debugger able to locate the sections of the developed kernel library code either during the actual process of library development or in sequence with the example MFW 116. In such examples, the example development system 140 allows for source-level debugging of the kernels along with the main application. In some examples, the data storage 230 can be used to store any data related to the kernel library development process (e.g., kernel libraries in development), including debugging.

FIG. 5 is a flowchart representative of machine readable instructions which may be executed to implement block 416 of FIG. 4 to implement the elements of the example computing system 102 of FIG. 1, the flowchart representative of instructions implemented to load a kernel library developed using the example development system of FIG. 2. The example computing system 102 includes the example host processor 108 which can include an accelerator driver to execute the example accelerator 112 of FIG. 1. The example host processor 108 drivers load the example MFW 116 into the memory (e.g., example memory 114) (block 502) and release a core to execute (block 504). The example host processor 108 loads new kernel libraries (e.g., example kernel(s) 118) into the host memory (e.g., example memory 114) (block 506). The example host processor 108 then triggers commands to the example MFW 116 (block 508) to bind the kernel libraries (block 510). In some examples, the example MFW 116 can perform the load operation (e.g., loading of the kernel libraries) before binding to the libraries (e.g., without use of the host processor as an intermediary). Given that kernels are built into dynamically loadable libraries, the developed libraries can hold many kernels and can be loaded into n supported banks (e.g., example bank 120 and/or example bank 122, the n established, in some examples, by a system manager). In some examples, the MFW 116 implements a dedicated library loader for the kernel libraries. In some examples, the example host processor 108 loads kernel libraries into example memory 114 after the example MFW 116 has been loaded into the example memory 114. In some examples, the example host processor 108 loads kernel libraries into example memory 114 after the core has been executed. In some examples, the example host processor 108 loads new kernels into example memory 114 (e.g., example kernel(s) 118) simultaneously with the example MFW 116, such that the example development system 140 can be executed (e.g., new kernel libraries can be developed) even in the presence of the loaded example MFW 116. For example, any alterations to the kernel libraries can be performed (e.g., including debugging), using the development system 140, even after the MFW 116 or other versions of the MFW 116 are loaded into memory 114.

Figure 6:
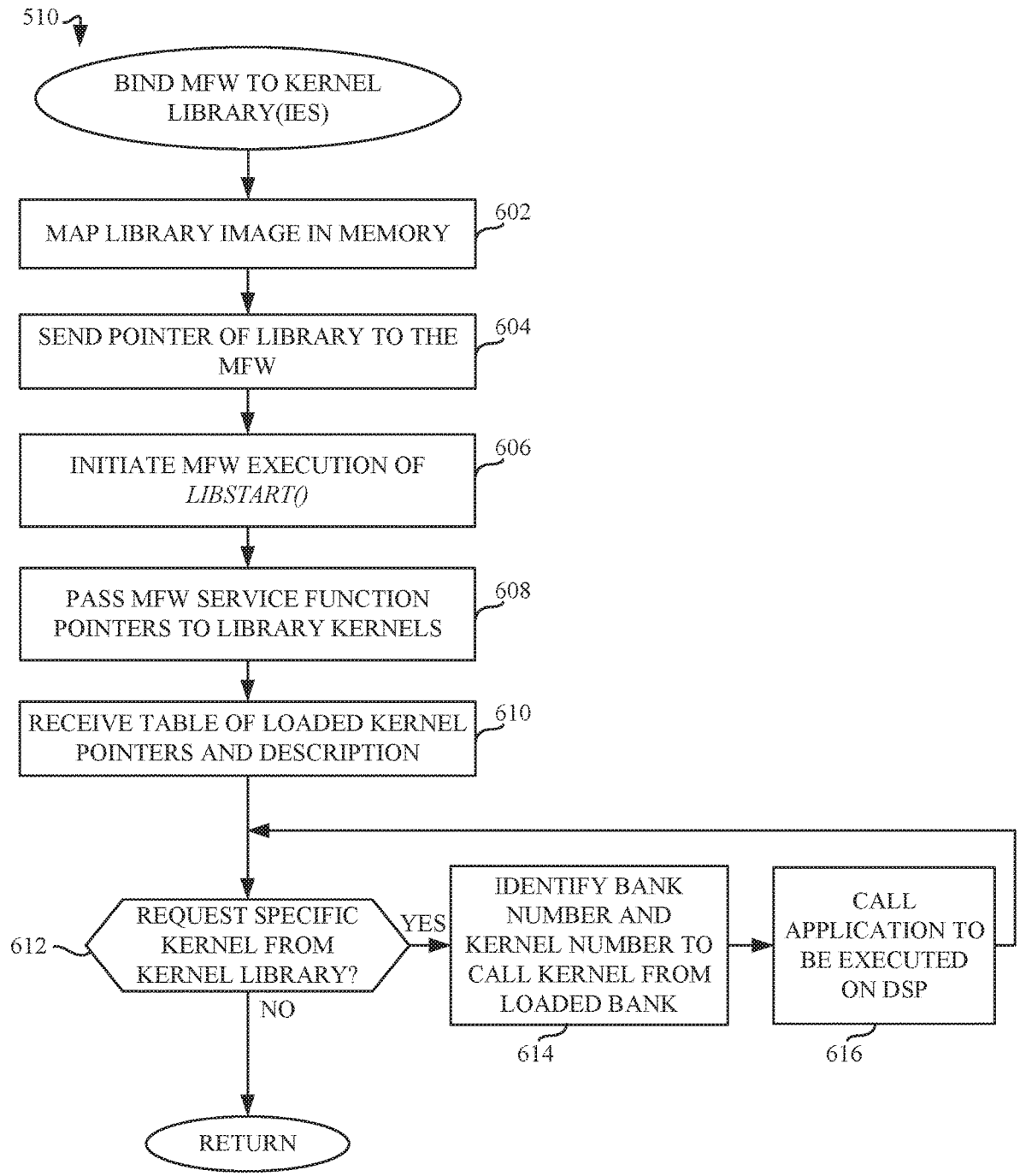
FIG. 6 is a flowchart representative of machine readable instructions which may be executed to implement elements of the example computing system of FIG. 1, the flowchart representative of instructions implemented to bind firmware to kernel libraries using the example development system of FIG. 2.

FIG. 6 is a flowchart representative of machine readable instructions which may be executed to implement block 508 of FIG. 5 to implement elements of the example computing system of FIG. 1, the flowchart representative of instructions implemented to bind firmware to kernel libraries developed using the example development system 140 of FIG. 2. For example, the host processor 108 maps the library image in the memory 114 (block 602). The example host processor 108 sends a pointer of the library to the example MFW 116 (block 604). Using the pointer to the library start function (e.g., libstart( )) incorporated into the library image by the example kernel library builder 210 of FIG. 3, the example MFW 116 executes the library start function (e.g., libstart( )) (block 606). As a result of the example MFW 116 executing libstart( ), the example MFW 116 passes its service function pointers to the library kernels (e.g., example kernel(s) 118) (block 608). In response, the example MFW 116 receives a table of loaded kernel pointers (e.g., kerneltable) and corresponding descriptions (block 610). For example, the kerneltable can hold metadata on each kernel as well as pointers to implemented functions. In some examples, the MFW 116 can request a specific kernel from the kernel library (e.g., example kernel(s) 118) (block 612). Such a request can be based on the overall system needs, such that the example MFW 116 itself decides that a kernel is to be called and/or an external trigger can cause the example MFW 116 to call a specific kernel at a particular point in time. The example MFW 116 identifies the bank number n (e.g., example bank 120, example bank 122) and kernel number within bank n needed to call the kernel from the bank loaded in example memory 114 (block 614). In some examples, once the kernel has been executed on the DSP 124 (block 616), the execution flow returns to the MFW 116, such that the MFW 116 can call the same or other kernel based on system needs (block 612). As such, the example DSP 124 transitions between MWF-based code and kernel-based code (e.g., kernel functions) that the MFW calls to execute. For example, the MFW 116 iteratively calls different kernels from the bounded library based on the needs of the system/application, such that the libraries are loaded and bound in order to execute several kernels, and/or a single kernel executed several times, before the initially-loaded library is replaced with a different library.

Figure 7:
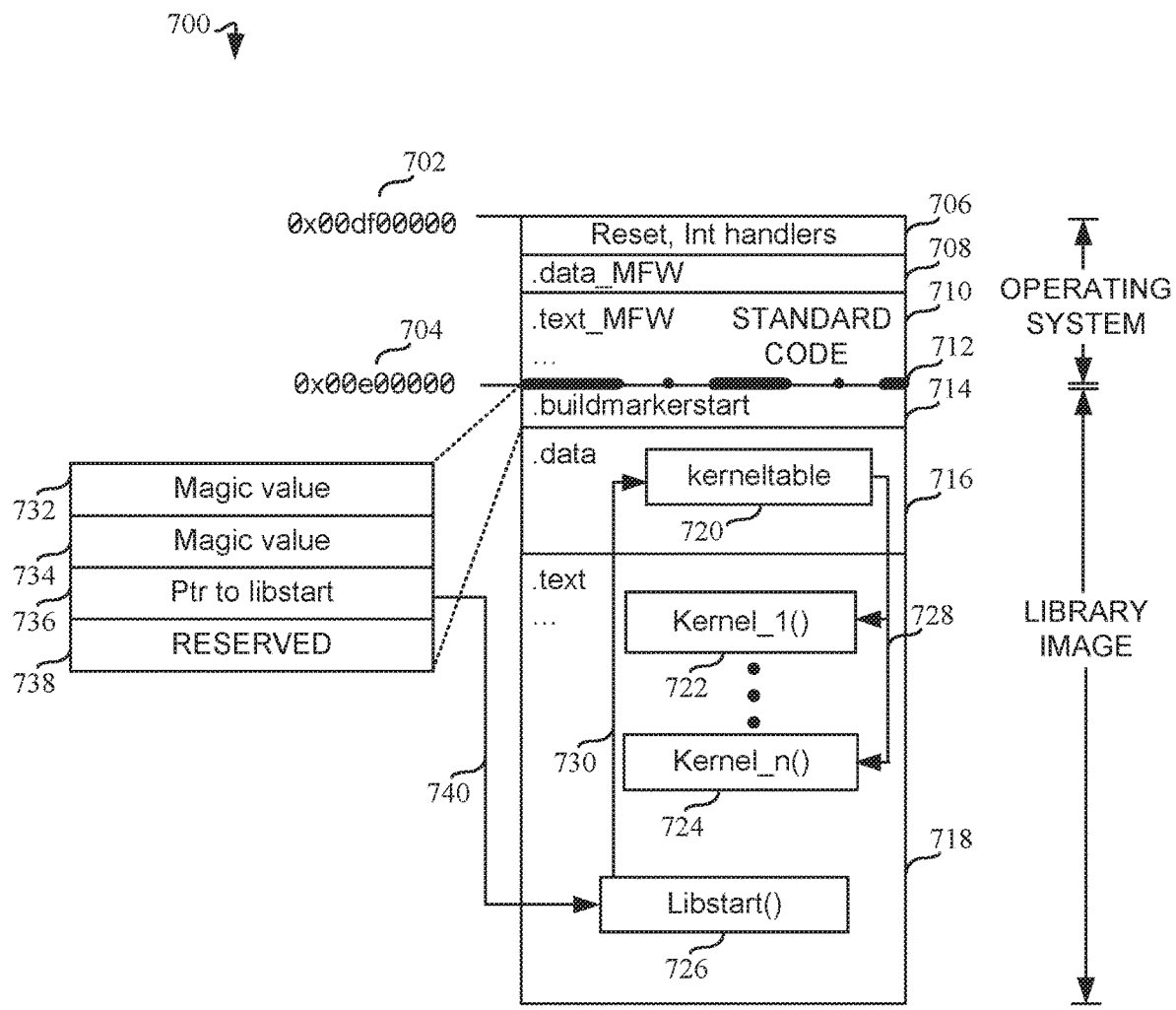
FIG. 7 is an example illustration of an executable and linkable format (ELF) file into which kernels are compiled in order to begin the kernel library build process using the example kernel library builder of FIG. 3.

FIG. 7 is an example illustration of an executable and linkable format (ELF) 700 into which kernels are compiled in order to begin the kernel library development process using the example kernel library builder 210 of FIG. 3. In the example ELF file 700, memory addresses (e.g., example memory addresses 702, 704) are used to identify sections of the ELF file 700. For example, sections of the ELF file 700 can include .data (e.g., initialized global C variables) and .text (e.g., machine code of compiled program). The ELF file 700 can include a header that begins with a 16-byte sequence that describes the word size and byte ordering of the system that generated the file, while the rest of the ELF 700 header can include, for example, information that allows a linker to parse and interpret the object file. Such information can include ELF 700 header size, object file type (e.g., relocatable, executable, etc.), machine type, and size/number of entries in the section header table. In the example generated ELF file 700 of FIG. 7, the file is divided into the operating system and library image sections starting at memory addresses 702 and 704, respectively. The operating system section of the ELF file 700 includes base code 706, 708, 710 (e.g., reset code, interrupt handlers, clib, CRT code, etc.) that is not needed for purposes of developing a new kernel library in the examples disclosed herein, since these sections correspond to code that is specific to the operating system from which the existing kernel library is used. Instead, the sections of the ELF file 700 needed for development of the kernel library using the example development system of FIGS. 2-3 are the library image sections 714, 716, 718, which begin at the example memory address 704 used by the example locator 302 of FIG. 3 to identify location of existing kernel library banks. These include the starting section of the library image (e.g., first 16 bytes of the library image in example buildmarkerstart 714), kernel table (e.g., example kerneltable 720), kernel functions (e.g., example kernel_1 ( ) 722, example kernel_n( ) 724), and the library start function (example Libstart( ) 726). The example image generator 306 of FIG. 3 therefore generates a library image which includes these sections, which can be further modified during kernel library development by the example kernel library builder 210. The example reducer 308 cuts, at 712, the operating system section information of the generated ELF file 700 (e.g., between memory addresses 702 and 704).

In order to assist the example MFW 116 in executing newly developed kernels, the example kernel library builder 210 of FIG. 3 includes a pointer to the library start function (e.g., example pointer to libstart( ) 736). In some examples, this pointer is incorporated within the first 16 bytes of the library image (e.g., in example .buildmarkerstart 714). For example, .buildmarkerstart can include example magic value(s) 732, 734 (e.g., each magic value having 4 bytes) to assist the example MFW 116 in verifying that the kernel library image, loaded into the example memory 114, is valid. The example .buildmarkerstart can further include, in some examples, another 4 bytes of code dedicated to the pointer to the library function (e.g., example Ptr to libstart 736), as well as an additional reserved section 738 of another 4 bytes, for a total of 16 bytes that form the .buildmarkerstart 714. During kernel library development, the example selector 310 of the example kernel library builder 210 of FIG. 3 selects n kernel functions (e.g., example kernel_1( ) 722 and/or example kernel_n( ) 724) to be included in the .text section 718 of the library image. In some examples, the kernel table (e.g., example kerneltable 720) is incorporated into the .data section of the ELF file 700. The kernel table can include a pointer 728 to kernel functions (e.g., example kernel_1( ) 722 and/or example kernel_n( ) 724) added to the library image during kernel library development using the example development system 140. As such, once the example MFW 116 identifies the pointer 740 to the library start function, the example MFW 116 can access the libstart function 726, which includes a pointer 730 to the kernel table 720. In return, the kernel table 720 includes pointer(s) 728 that allow for kernel functions 724, 724 to be executed.

Figure 8:
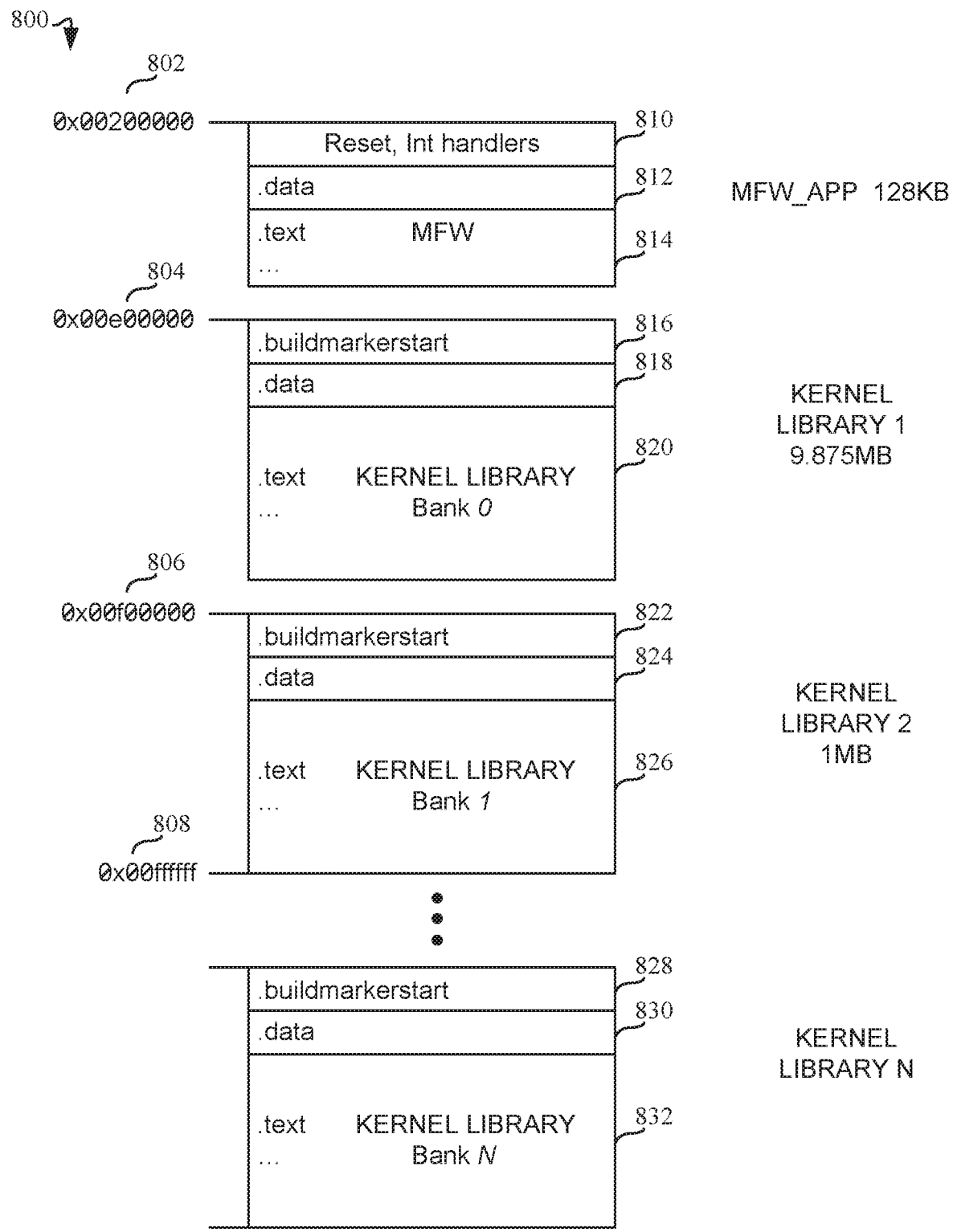
FIG. 8 is an example illustration of a set of kernel libraries developed using the example kernel library builder of FIG. 3.

FIG. 8 is an example illustration of a set of kernel libraries developed using the example kernel library builder 210 of FIG. 3. The set of kernel libraries shown in FIG. 8 correspond to the kernel libraries developed, using the example development system 140, based on the generated library image of the example ELF file 700. The example host processor 108 loads the kernel library into example memory 114, with operating system section specific to the example MFW 116 (e.g., MFW APP, 128 KB) included starting at example memory address 802. The example operating system sections include the base code 810, 812, and 814 that are not originally a part of the developed kernel library. As such, the developed kernel library allows for a high level of decoupling from the example MFW 116 that makes the kernel library development process independent of the previous, existing, or future MFWs loaded into the host memory (e.g., example memory 114). The kernel library or libraries loaded into the host memory (e.g., example kernel(s) 118) include n number of libraries (e.g., Kernel library 1, Kernel library 2, Kernel library n) loaded inn number of banks, depending, in some examples, on the organization of kernel libraries in banks determined during the kernel library development process. The example kernel libraries have the .buildmarkerstart content (e.g., content 816, 822, 828 at memory addresses 804, 806, etc.) included at the beginning of the library image (e.g., first 16 bytes of the library image), as shown in the example ELF file 800 of FIG. 8. The example kernel libraries 1, 2, and n can include .data regions 818, 824, and 830, respectively, that provide access to kernel tables (e.g., example kerneltable 720 of FIG. 7). The example kernel functions (e.g., example kernel_1( ) 722 and/or example kernel_n( ) 724 of FIG. 7) are incorporated, in some examples, into the .text regions 820, 826, and 832 of the kernel library. In some examples, the kernel can be implemented as a C function, receiving a standard handle (e.g., kernel handle) from the example MFW 116 to receive and return data to the MFW 116 which calls the kernel function. For example, the handle may be used to return a status in a manner consistent with Example 1:

```
uint32_t add_kernel (kernel_handle_t* handle) {         Example 1
debug_printf("add exec called\n");       // example of MFW-service
                                         call,
// allowing kernel to call MFW services
...                                      // perform some operation of this
                                         kernel
// (e.g. add two streams of values from 2 input locations into an output
location)
return status;
}
```

In some examples, the example kernel library builder 210 defines a single kernel and provides a bank of kernels descriptor entry in a manner consistent with that of Examples 2 and 3, respectively. In some examples, other implementations can use other kinds of structures that represent the kernels to the relevant main application (e.g., MFW 116). In some examples, kernel functions share the same C prototype (e.g., kernels receive the same argument list and return the same type). For example, the kernel receives a handle and returns an init for a status (e.g., function called by the MFW 116 before activating the main kernel callback). Additionally, in some examples, the kernel may expose two such functions, one function to be called by the MFW 116 at init time (e.g., after library is loaded, before a kernel is being used), such that one of the functions is the actual execution function. In some examples, the kernel descriptor can hold other information for every kernel (e.g., number of input and output streams as in Example 2). In some examples, these descriptors can be arranged in a table (e.g., kernelsTable of Example 3).

```
/* definition of a single kernel */                                Example 2
typedef uint32_t (*kernelFunc) (kernel_handle_t* handle);
typedef struct {            // example descriptor of kernel
    kernelFunc    init;     // init function to be called by MFW before activating the
// main kernel callback
    kernelFunc    execute;  // main callback function of the kernel, performing // the
kernel operation
    uint8_t       InputArgsCount;    // number of inputs to kernel
    uint8_t       OutputArgsCount;   // number of outputs to kernel
} kernel_desc_t;
typedef kernel_desc_t kernelsTable_t[ ]; // table of kernels
/* Bank of kernels descriptor entry */                             Example 3
typedef struct {
uint16_tkernelCount;
uint16_treserved;
kernel_desc_t*kernelsTable_t;
} kernel_bank_t; // example structure to hold all the information for all the kernels
// included in a bank.
typedef kernel_bank_t kernelsBanks_t[ ];   // example table that holds all the
// information for all the loaded banks
```

In some examples, the content of the header file included in the kernel space and the content of the header file included in the library source are consistent with that of Examples 4 and 5, respectively:

```
// content of header file that is included in every kernel source          Example 4
// enable registration of "system callbacks" provided by the MFW to the kernels,
such that the kernels can call them during operation.
// MFW system calls are defined as calling via pointer to function.
//upon binding to the library, MFW populates pointers with pointers of implemented functions.
// one example for such callback: printing mechanism:
extern void (*MFW_lib_printf)(const char *,...);
#define debug_printf(...) (*MFW_lib_printf) (___VA_ARGS___)
// second example: request for memory:
extern char* (*MFW_allocate_memory)(uint32_t size);
#define allocate_mem(a) (*MFW_allocate_memory) (a)
// content of file that is included in library source                      Example 5
kernelsBanks_t* libstart (libCBfuncs funcs)
{
    MFW_lib_printf = (void (*)(const char *,...)) funcs[0];
    MFW_allocate_memory = (char* (*)(uint32_t)) funcs[1];
    return &kernelsBank0;
}
#define MFW_LIB_MAGIC {MFW_LIB_MAGIC0 , MFW_LIB_MAGIC1,
(unsigned int)libstart, 0x00000000}
static unsigned int markerstart[ ]
___attribute___((section(".buildmarkerstart"))) = MFW_LIB_MAGIC;
```

In some examples, kernels inside the developed library (e.g., add_kernel and complement_kernel) implement one or more functions, whereas the kernel table (e.g., kernels Table) holds the metadata on each kernel and pointers to the implemented functions, consistent with Examples 6 and 7:

```
uint32_t add_kernel (kernel_handle_t* handle) {         Example 6
    debug_printf("add exec called\n");
    ...
    return 0;
}
// MFW_KERNEL_* are enumerations, used for placement in the table
kernelsTable_t kernelsBank0 = {                          Example 7
{ MF_FUNC_NULL, add_kernel , 2, 1},
{ complement_kernel_init, complement_kernel , 1, 1},
};
kernelsBanks_t customerkernelBanks = {2, 0, kernelsBank0}; // registers 2 kernel tables
```

In some examples, the MFW 116 loads the developed kernel library based on a table of system call functions for the kernels in a manner consistent with Example 8:

```
// preparing table of system-call functions for the kernels:    Example 8
typedef void (*libCBfunc) ( );
libCBfuncs funcs = {
(libCBfunc) print_function,
(libCBfunc) allocate_memory
, ... };
```

In some examples, the MFW 116 extracts and checks the magic values (e.g., magic values 732, 734 of FIG. 7) to ensure that the library has loaded correctly and accesses the pointer to the library start function (e.g., libptr) included in the library image (e.g., ptr to libstart 736 of FIG. 7), the pointer to the library start function corresponding to where the driver has placed the library in system memory (e.g., consistent with Example 9). Identification of the library start function location (e.g., Libstart( ) 726 of FIG. 7) and calling of Libstart( ) by the example MFW 116 provides the table of system call pointers and table of kernels (e.g., kerneltable 720 of FIG. 7) via the pointer to the kernel table (e.g., pointer 730 of FIG. 7). In some examples, the process of retrieving the example kernel table 720 of FIG. 7 is in a manner consistent with Example 10:

```
// libptr is where driver has placed the library in the system memory    Example 9
unsigned int * magic = (unsigned int *) libptr;
check_library(magic);
// libentry is located 16K into the start of the library
// calculating location of libstart function within the loaded library:
#define libstart_func(x) (libstartfunc)(((unsigned int*)((x)))[2])
libstartfunc f = libstart_func(libptr);
// calling libstart, providing table of system-call pointers
// and receiving table of kernels:                                       Example 10
kernelsBanks_t * customerkernelBanks = f(funcs);
```

In some examples, the MFW 116 calls a specific kernel from the loaded banks (e.g., kernel banks 120 and 122 of FIG. 1) using the bank number (e.g., kernel library at bank 1, 2, and/or n of FIG. 8) and kernel number (e.g., kernel_1 ( ) 722 and/or kernel_n( ) 726 of FIG. 7). The example MFW 116 can call the kernel from the loaded banks in a manner consistent with Example 11:

```
kernel_desc_t         *k;                    Example 11
kernel_handle_t handle;                // input to kernel
uint32_t              status;
handle = ...;
k = &kernelBanks[bank_num].kernelsTable_t[kernel_num];
status = (*k->execute)(handle); // calling the kernel execute function
```

During the process of debugging using the example debugger 220 of FIG. 2, example debugger 220 locates sections of the kernel library code during the actual process of library development and/or in sequence with the example MFW 116. In such examples, the development system 140 allows for source-level debugging of the kernels along with the main application. In some examples, debugging can be performed in a manner consistent with Example 12, such that the example debugger 220 identifies the library image file (e.g., image file) and associated locations of the code in need of debugging (e.g., location of text, etc.):

```
add-symbol-file <image_file><location of
    text><specific sections and locations>    Example 12
```

Figure 9:
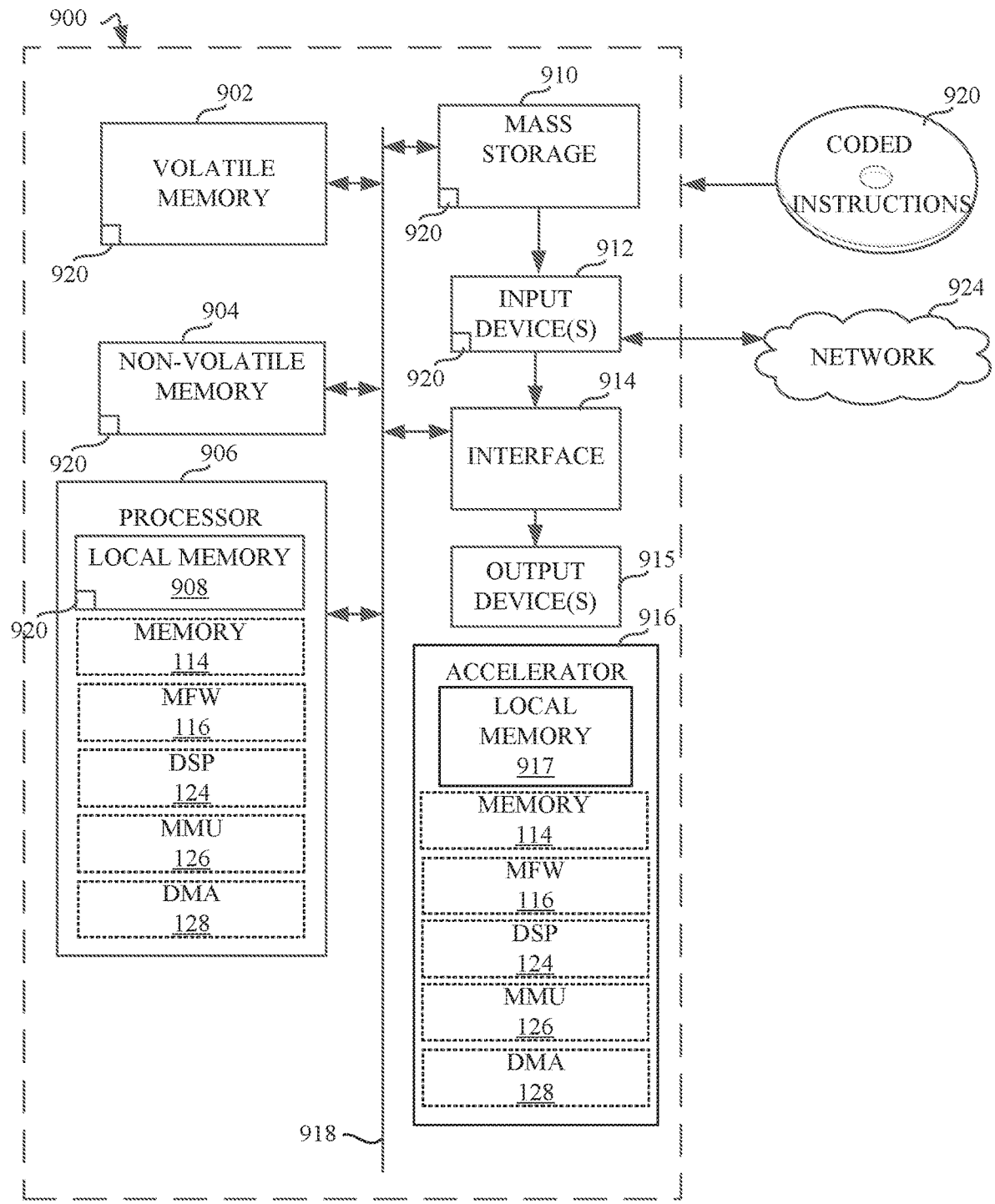
FIG. 9 is a block diagram of an example processing platform structured to execute the instructions of FIGS. 4-6 to implement the example computing and development systems of FIGS. 1-3.

FIG. 9 is a block diagram of an example processing platform 900 structured to execute the instructions of FIGS. 4-6 to implement the example computing and development systems of FIGS. 1-3. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a gaming console, a personal video recorder, a set top box, a headset or other wearable device, or any other type of computing device.

The processor platform 900 of the illustrated example includes a processor 906 and an accelerator 916. The processor 906 of the illustrated example is hardware. For example, the processor 906 can be implemented by one or more integrated circuits, logic circuits, microprocessors, GPUs, DSPs, or controllers from any desired family or manufacturer. The hardware processor may be a semiconductor based (e.g., silicon based) device. Additionally, the accelerator 916 can be implemented by, for example, one or more integrated circuits, logic circuits, microprocessors, GPUs, DSPs, FPGAs, VPUs, controllers, and/or other CBBs from any desired family or manufacturer. The accelerator 916 of the illustrated example is hardware. The hardware accelerator may be a semiconductor based (e.g., silicon based) device. In this example, the accelerator 916 implements the example memory 114, the example MFW 116, the example DSP 124, the example MMU 126, and the example DMA 128. In this example, the processor implements the example memory 114, the example MFW 116, the example DSP 124, the example MMU 126, and the example DMA 128, and/or, more generally, the example accelerator 112 of FIG. 1.

The processor 906 of the illustrated example includes a local memory 908 (e.g., a cache). The processor 906 of the illustrated example is in communication with a main memory including a volatile memory 902 and a non-volatile memory 904 via a bus 918. Moreover, the accelerator 916 of the illustrated example includes a local memory 917 (e.g., a cache). The accelerator 916 of the illustrated example is in communication with a main memory including the volatile memory 902 and the non-volatile memory 904 via the bus 918. The volatile memory 902 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 904 may be implemented by flash memory and/or any other desired type of memory device. Access to the main memory 902, 904 is controlled by a memory controller.

The processor platform 900 of the illustrated example also includes an interface circuit 914. The interface circuit 914 may be implemented by any type of interface standard, such as an Ethernet interface, a universal serial bus (USB), a Bluetooth® interface, a near field communication (NFC) interface, and/or a PCI express interface.

In the illustrated example, one or more input devices 912 are connected to the interface circuit 914. The input device(s) 912 permit(s) a user to enter data and/or commands into the processor 906 and/or the accelerator 916. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 915 are also connected to the interface circuit 914 of the illustrated example. The output devices 915 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 914 of the illustrated example, thus, typically includes a graphics driver card, a graphics driver chip and/or a graphics driver processor.

The interface circuit 914 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 924. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 910 for storing software and/or data. Examples of such mass storage devices 910 include floppy disk drives, hard drive disks, compact disk drives, Blu-ray disk drives, redundant array of independent disks (RAID) systems, and digital versatile disk (DVD) drives.

The machine executable instructions 920 of FIGS. 4, 5 and/or 6 may be stored in the mass storage device 910, in the volatile memory 902, in the non-volatile memory 904, and/or on a removable non-transitory computer readable storage medium such as a CD or DVD.

From the foregoing, it will be appreciated that example systems, methods, and apparatus allow for improved efficiency of kernel library development through the decoupling of the kernel library development process from the firmware. Examples disclosed herein permit the development and wrapping of kernels in libraries which are dynamically loadable during execution by generic firmware (e.g., master firmware (MFW) product, home-brewed operating system, etc.) without the need for a compile time link to the MFW. Examples disclosed herein further allow the flexibility of introducing newer versions of the MFW while the libraries do not have to be rebuilt, which is especially important if they are customer-developed libraries. Examples disclosed herein permit the linking of kernels against the MFW, with the new kernels and kernel libraries created after the main MFW has been frozen and released in a product, such that the main MFW sources are not needed during the development process. Furthermore, examples disclosed herein also allow for source level debugging of kernels during development along with the main application.

Disclosed herein are example systems, apparatus, and methods for improved efficiency of kernel library development through the decoupling of the kernel library development process from the firmware. Example 1 includes an apparatus for kernel library development, comprising a compiler to compile kernels into an executable and linkable format, the kernels residing in an existing kernel library in a system memory, an image generator to generate library images from executable and linkable format locations based on identified offsets in the linkable format, a reducer to retrieve, using the system memory, a library image, the library image retrieved starting from a first section of the existing library, the retrieved library image to be used as a platform for developing a new kernel library, a selector to select kernels to include in the new kernel library, one or more libraries organized into a defined number of kernel banks, the kernels combined based on intended application development, and a linker to link a library start function pointer to the library start function, the library start function positioned within the library image, the pointer incorporated in a first section of the library image.

Example 2 includes the apparatus of Example 1, wherein the retrieved library image includes kernel functions, kernel tables, and the library start function.

Example 3 includes the apparatus of Example 1, wherein the library start function is executed by firmware to load the kernel library, the firmware loaded into a host memory.

Example 4 includes the apparatus of Example 3, wherein, when executed, the library start function passes firmware service function pointers to library kernels, the firmware to receive a table of loaded kernels, the table providing kernel descriptions.

Example 5 includes the apparatus of Example 1, wherein the reducer removes operating system base code from the retrieved library image.

Example 6 includes the apparatus of Example 1, wherein the pointer to the library start function is within a section corresponding to a first sixteen bytes of the generated library image.

Example 7 includes the apparatus of Example 1, further including a debugger to debug based on memory addresses connected to sections of the executable and linkable format of the developed kernel library.

Example 8 includes the apparatus of Example 1, wherein the kernel library development is decoupled from firmware sources, wherein one or more system calls are not linked along with the library, the kernel library executed by one or more versions of firmware.

Example 9 includes a method for kernel library development, comprising compiling kernels into an executable and linkable format, the kernels residing in an existing kernel library in a system memory, generating library images from executable and linkable format locations based on identified offsets in the linkable format, retrieving, using the system memory, a library image, the library image retrieved starting from a first section of the existing library, the retrieved library image to be used as a platform for developing a new kernel library, selecting kernels to include in the new kernel library, one or more libraries organized into a defined number of kernel banks, the kernels combined based on intended application development, and linking a library start function pointer to the library start function, the library start function positioned within the library image, the pointer incorporated in a first section of the library image.

Example 10 includes the method of example 9, wherein the retrieved library image includes kernel functions, kernel tables, and the library start function.

Example 11 includes the method of example 9, wherein the library start function is executed by firmware to load the kernel library, the firmware loaded into a host memory.

Example 12 includes the method of example 11, wherein, when executed, the library start function passes firmware service function pointers to library kernels, the firmware to receive a table of loaded kernels, the table providing kernel descriptions.

Example 13 includes the method of example 9, wherein the retrieving a library image further includes removing operating system base code from the retrieved library image.

Example 14 includes the method of example 9, wherein the pointer to the library start function is within a section corresponding to a first sixteen bytes of the generated library image.

Example 15 includes the method of example 9, further including debugging based on memory addresses connected to sections of the executable and linkable format of the developed kernel library.

Example 16 includes the method of example 9, wherein the kernel library development is decoupled from firmware sources, wherein one or more system calls are not linked along with the library, the kernel library executed by one or more versions of firmware.

Example 17 includes a non-transitory computer readable storage medium comprising computer readable instructions that, when executed, cause one or more processors to, at least compile kernels into an executable and linkable format, the kernels residing in an existing kernel library in a system memory, generate library images from executable and linkable format locations based on identified offsets in the linkable format, retrieve, using the system memory, a library image, the library image retrieved starting from a first section of the existing library, the retrieved library image to be used as a platform for developing a new kernel library, select kernels to include in the new kernel library, one or more libraries organized into a defined number of kernel banks, the kernels combined based on intended application development, and link a library start function pointer to the library start function, the library start function positioned within the library image, the pointer incorporated in a first section of the library image.

Example 18 includes the storage medium of example 17, wherein the instructions, when executed, cause the one or more processors to retrieve kernel functions, kernel tables, and the library start function.

Example 19 includes the storage medium of example 17, wherein the instructions, when executed, cause the one or more processors to execute the library start function and load the kernel library.

Example 20 includes the storage medium of example 19, wherein the instructions, when executed, cause the one or more processors to pass firmware service function pointers to library kernels and receive a table of loaded kernels, the table providing kernel descriptions.

Example 21 includes the storage medium of example 17, wherein the instructions, when executed, cause the one or more processors to remove operating system base code from the retrieved library image.

Example 22 includes the storage medium of example 17, wherein the instructions, when executed, cause the one or more processors to position the pointer to the library start function within a section corresponding to a first sixteen bytes of the generated library image.

Example 23 includes the storage medium of example 17, wherein the instructions, when executed, cause the one or more processors to debug based on memory addresses connected to sections of the executable and linkable format of the developed kernel library.

Example 24 includes the storage medium of example 17, wherein the instructions, when executed, cause the one or more processors to decouple kernel library development from firmware sources, wherein one or more system calls are not linked along with the library, the kernel library executed by one or more versions of firmware.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for kernel library development, comprising:
    a compiler to compile kernels into an executable and linkable format, the kernels residing in an existing kernel library in a system memory;
    an image generator to generate library images from executable and linkable format locations based on identified offsets in the linkable format;
    a reducer to retrieve, using the system memory, a library image, the library image retrieved starting from a first section of the existing kernel library, the retrieved library image to be used as a platform for developing a new kernel library;
    a selector to select kernels to include in the new kernel library, one or more new kernel libraries organized into a defined number of kernel banks, the kernels combined based on intended application development; and
    a linker to link a library start function pointer to a library start function, the library start function positioned within the retrieved library image, the pointer incorporated in a first section of the retrieved library image,
    wherein at least one of:
    A) the library start function is executed by firmware to load the new kernel library, the firmware loaded into a host memory, wherein, when executed, the library start function passes firmware service function pointers to library kernels, the firmware to receive a table of loaded kernels, the table providing kernel descriptions, or
    B) the kernel library development is decoupled from firmware sources, one or more system calls not linked along with the library of the one or more libraries, the new kernel library executed by one or more versions of firmware,
    wherein at least one of the compiler, the image generator, the reducer, the selector, or the linker is implemented by a logic circuit.

2. The apparatus of claim 1, wherein the retrieved library image includes kernel functions, kernel tables, and the library start function.

3. The apparatus of claim 1, wherein the reducer removes operating system base code from the retrieved library image.

4. The apparatus of claim 1, wherein the pointer to the library start function is within a section corresponding to a first sixteen bytes of the generated library image.

5. The apparatus of claim 1, further including a debugger to debug based on memory addresses connected to sections of the executable and linkable format of the new kernel library.

6. A method for kernel library development, comprising:
    compiling kernels into an executable and linkable format, the kernels residing in an existing kernel library in a system memory;
    generating library images from executable and linkable format locations based on identified offsets in the linkable format;
    retrieving, using the system memory, a library image, the library image retrieved starting from a first section of the existing kernel library, the retrieved library image to be used as a platform for developing a new kernel library;
    selecting kernels to include in the new kernel library, one or more new kernel libraries organized into a defined number of kernel banks, the kernels combined based on intended application development; and
    linking a library start function pointer to a library start function, the library start function positioned within the retrieved library image, the pointer incorporated in a first section of the retrieved library image,
    wherein at least one of:
    A) the library start function is executed by firmware to load the new kernel library, the firmware loaded into a host memory, wherein, when executed, the library start function passes firmware service function pointers to library kernels, the firmware to receive a table of loaded kernels, the table providing kernel descriptions, or
    B) the kernel library development is decoupled from firmware sources, one or more system calls not linked along with the library of the one or more libraries, the new kernel library executed by one or more versions of firmware.

7. The method of claim 6, wherein the retrieved library image includes kernel functions, kernel tables, and the library start function.

8. The method of claim 6, wherein the retrieving a library image further includes removing operating system base code from the retrieved library image.

9. The method of claim 6, wherein the pointer to the library start function is within a section corresponding to a first sixteen bytes of the generated library image.

10. The method of claim 6, further including debugging based on memory addresses connected to sections of the executable and linkable format of the new kernel library.

11. A non-transitory computer readable storage medium comprising computer readable instructions that, when executed, cause one or more processors to, at least:
    compile kernels into an executable and linkable format, the kernels residing in an existing kernel library in a system memory;
    generate library images from executable and linkable format locations based on identified offsets in the linkable format;

retrieve, using the system memory, a library image, the library image retrieved starting from a first section of the existing kernel library, the retrieved library image to be used as a platform for developing a new kernel library;

select kernels to include in the new kernel library, one or more new kernel libraries organized into a defined number of kernel banks, the kernels combined based on intended application development; and link a library start function pointer to a library start function, the library start function positioned within the retrieved library image, the pointer incorporated in a first section of the retrieved library image, wherein at least one of:
- A) the one or more processors to execute the library start function and load the new kernel library, the one or more processors to pass firmware service function pointers to library kernels and receive a table of loaded kernels, the table providing kernel descriptions, or
- B) the one or more processors to decouple kernel library development from firmware sources, one or more system calls not linked along with the library of the one or more libraries, the new kernel library executed by one or more versions of firmware.

12. The storage medium of claim 11, wherein the instructions, when executed, cause the one or more processors to retrieve kernel functions, kernel tables, and the library start function.

13. The storage medium of claim 11, wherein the instructions, when executed, cause the one or more processors to remove operating system base code from the retrieved library image.

14. The storage medium of claim 11, wherein the instructions, when executed, cause the one or more processors to position the pointer to the library start function within a section corresponding to a first sixteen bytes of the generated library image.

15. The storage medium of claim 11, wherein the instructions, when executed, cause the one or more processors to debug based on memory addresses connected to sections of the executable and linkable format of the new kernel library.

* * * * *